March 11, 1924.

I. BERRY

BUMPER

Filed Sept. 27, 1923

1,486,222

Inventor
Irwin Berry
By Arthur M. Nelson
Attorney

Patented Mar. 11, 1924.

1,486,222

UNITED STATES PATENT OFFICE.

IRWIN BERRY, OF WILMETTE, ILLINOIS.

BUMPER.

Application filed September 27, 1923. Serial No. 665,113.

*To all whom it may concern:*

Be it known that I, IRWIN BERRY, a citizen of the United States, and a resident of Wilmette, county of Cook, and State of Illinois, have invented certain new and useful Improvements in Bumpers, of which the following is a specification.

My invention relates generally to improvements in bumpers but relates more particularly to improvements in bumpers of the type adapted to be attached to the front or rear of an automobile.

The general object of my invention is to provide an automobile bumper which shall serve not only to protect the automobile from damage but which also shall serve to carry an emergency supply of fuel and other material necessary for the operation of the automobile.

Again I aim to provide an automobile bumper which shall be simple in construction, inexpensive, and which can be quickly and easily attached to the machine.

Another object of my invention is to provide an automobile bumper and emergency fuel carrier of such construction that the contents thereof shall be free from tampering by children or merely curious persons.

My invention consists generally in a device of the form, arrangement, construction and co-operation of the parts whereby the above named objects, together with others that will appear hereinafter are attainable, and my invention will be more readily understood by reference to the accompanying drawings which illustrate what I consider to be the preferred embodiment, at the present time.

Figure 1:
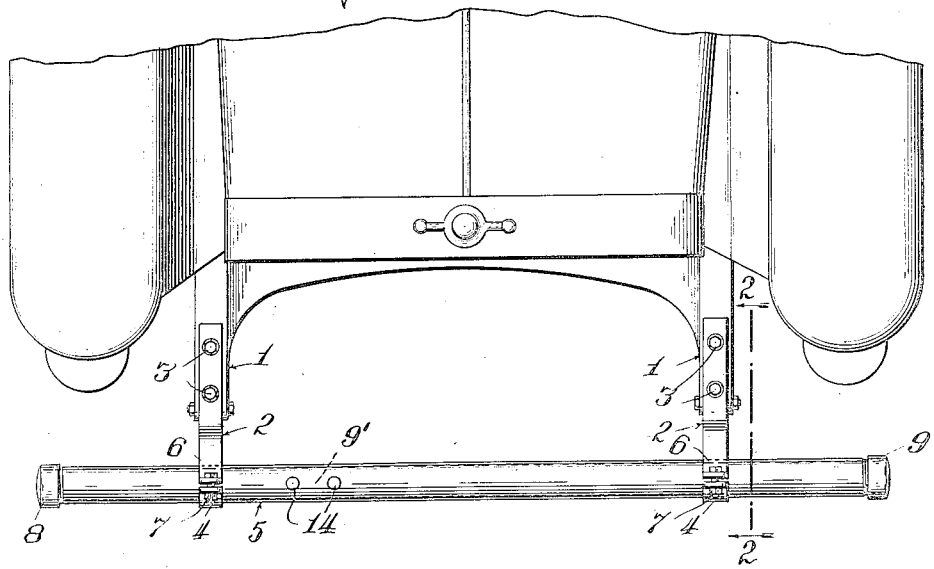
Fig. 1 is a top plan view of the forward part of the automobile equipped with a bumper embodying my invention.
Figure 2:
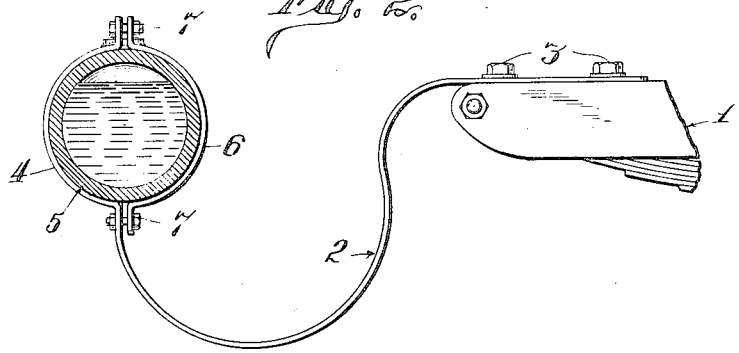
Fig. 2 is an enlarged view substantially along the line 2—2 of Fig. 1.
Figure 3:
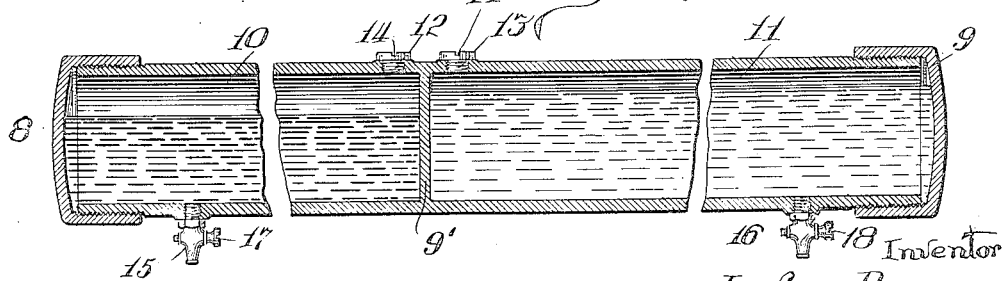
Fig. 3 is a fragmentary vertical longitudinal section through the bumper proper.

In automobile practice, it is quite common to provide gages which are intended to indicate the supply of gasolene and oil on hand, but nevertheless motorists at times exhaust their supply so that it is quite common practice to carry a separate supply of gasoline, oil and sometimes water for such emergencies. Such emergency supply is usually carried in one or more containers which, for lack of room, are frequently secured to the running board. Under this practice added equipment is necessary which utilizes valuable space, particularly when such devices are most needed, as during extensive touring trips. I have provided a device whereby an emergency supply of fuel and oil and water, if desired, may be carried without occupying any other usable space.

Referring now to the drawings for the details of construction 1, represents the frame of the automobile to which there are secured brackets 2 as by means of bolts or machine screws 3. The brackets 2 are preferably curved and composed of spring material so that they may yield to a very considerable extent in the event of a collision. As here shown the outer ends of the brackets 2 are provided with a curved portion 4 which partly embraces a tubular metal member 5. A clamp 6 embraces the remainder of the tube 5, the parts being tightly clamped by means of bolts 7. Obviously, in this manner, the tubular member 5 may be suitably supported from the automobile. The ends of the tube 5, as here shown, are closed as by means of caps 8 and 9 and at one point the tube 5 contains a cross wall 9', thus dividing the tube into two chambers 10 and 11. As here shown, the wall 9' is closer to one end of the tube than it is to the other. The reason for this is that the chamber 10 is to be used for lubricating oil whereas the chamber 11 is or may be used for gasolene or other fuel of which a larger reserve supply is desirable. In order to provide for the filling and withdrawal of the lubricating oil and gasolene a filler cap 12 is provided for the chamber 10 and a similar cap 13 for the chamber 11, each of which is provided with a slot 14 so that they may be tightly secured by means of a screw driver and which, therefore, cannot be removed without a similar tool. The chamber 10 is likewise provided with a petcock 15 and the chamber 11 with a similar cock 16 which have elements 17 and 18 respectively, likewise containing slots so that they may be operated only by means of a screw driver.

Obviously a supply of gasolene may be carried in the chamber 11 and lubricating oil or other material in the chamber 10 and inasmuch as most cars are equipped with bumpers there is no duplication of equipment, the bumper serving a dual purpose.

The many advantages of my invention will be understood by those skilled in this art without further comment.

I claim:

1. An automobile bumper comprising an elongated metallic member having a gasoline chamber therein, and means whereby gasoline may be placed therein and removed therefrom.

2. An automobile bumper comprising an elongated member having a plurality of chambers therein, and means whereby liquid may be placed in and removed from said chambers.

3. An automobile bumper comprising a metal tube, having a gasoline filling opening and closure therefor, and a gasoline discharge opening and control therefor.

4. An automobile bumper comprising a metal tube, means dividing it into a plurality of chambers, and means whereby liquid may be placed in and removed from said chambers.

5. An automobile bumper comprising an elongated member having a chamber therein, a gasoline filling opening therein, a cap for closing same, said cap being formed so that a tool is required for its operation, a discharge opening and a valve therefor, said valve being formed so that a tool is required to operate it.

6. An automobile bumper comprising a metallic member having a gasoline chamber therein, and means whereby gasoline may be placed therein and removed therefrom.

7. An automobile bumper comprising a member having a plurality of chambers therein and means whereby liquid may be placed in and removed from said chambers.

In testimony whereof, I have hereunto set my hand, this 14th day of September, 1923.

IRWIN BERRY.